US012069461B2

(12) United States Patent
Lai et al.

(10) Patent No.: US 12,069,461 B2
(45) Date of Patent: Aug. 20, 2024

(54) SPEAKER

(71) Applicant: Merry Electronics(Shenzhen) Co., Ltd., ShenZhen (CN)

(72) Inventors: Tsai Ti Lai, Taichung (TW); Tsung-Lung Chang, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 191 days.

(21) Appl. No.: 17/970,558

(22) Filed: Oct. 20, 2022

(65) Prior Publication Data

US 2024/0098424 A1 Mar. 21, 2024

(30) Foreign Application Priority Data

Sep. 19, 2022 (TW) .................................. 111135411

(51) Int. Cl.

| | |
|---|---|
| ***H04R 9/06*** | (2006.01) |
| ***H04R 7/12*** | (2006.01) |
| ***H04R 9/02*** | (2006.01) |
| ***H04R 9/04*** | (2006.01) |

(52) U.S. Cl.

CPC ............... *H04R 9/06* (2013.01); *H04R 7/122* (2013.01); *H04R 9/025* (2013.01); *H04R 9/046* (2013.01); *H04R 2400/11* (2013.01)

(58) Field of Classification Search

CPC .......... H04R 9/06; H04R 7/122; H04R 9/025; H04R 9/046; H04R 2400/11; H04R 7/20; H04R 9/043; H04R 7/127

See application file for complete search history.

(56) References Cited

U.S. PATENT DOCUMENTS

2021/0352411 A1* 11/2021 Lee .......................... H04R 7/18
2023/0388717 A1* 11/2023 O'Brien .................. H04R 7/12

* cited by examiner

*Primary Examiner* — Tuan D Nguyen
(74) *Attorney, Agent, or Firm* — JCIPRNET

(57) ABSTRACT

A speaker includes a frame, a magnetic circuit system, a balance element, and a diaphragm. The frame has a perforation, a bearing surface, and an accommodating space surrounding the perforation. The magnetic circuit system is disposed in the accommodating space and includes a voice coil and a magnet, and the voice coil is located between the bearing surface and the magnet. The diaphragm has a hole corresponding to the perforation, and the diaphragm is connected to the frame and the voice coil. The balance element is disposed in the accommodating space and surrounds the perforation, and the balance element is connected to the voice coil and the bearing surface.

9 Claims, 10 Drawing Sheets

SPEAKER

CROSS-REFERENCE TO RELATED APPLICATION

This application claims the priority benefit of Taiwanese application no. 111135411, filed on Sep. 19, 2022. The entirety of the above-mentioned patent application is hereby incorporated by reference herein and made a part of this specification.

BACKGROUND OF THE INVENTION

Field of the Invention

The invention relates to a speaker, and in particular to an open speaker.

Description of Related Art

Generally speaking, a speaker may make the diaphragm vibrate by the movement of the voice coil under the action of the electromagnetic force to emit sound. However, in the case of higher power, the displacement range of the voice coil is increased, which may cause a shaking situation of left and right swing, and stable up and down movement is more difficult, thus affecting the quality of treble.

SUMMARY OF THE INVENTION

The invention provides a speaker that may improve the movement stability of the voice coil.

A speaker of the invention includes a frame, a magnetic circuit system, a balance element, and a diaphragm. The frame has a perforation, a bearing surface, and an accommodating space surrounding the perforation. The magnetic circuit system is disposed in the accommodating space and includes a voice coil and a magnet, and the voice coil is located between the bearing surface and the magnet. The diaphragm has a hole corresponding to the perforation, and the diaphragm is connected to the frame and the voice coil. The balance element is disposed in the accommodating space and surrounds the perforation, and the balance element is connected to the voice coil and the bearing surface.

In an embodiment of the invention, the balance element includes a first fixing portion, a deforming portion, and a second fixing portion, the first fixing portion is connected to the voice coil, the second fixing portion is disposed at the bearing surface, and the deforming portion is located between the second fixing portion and the first fixing portion.

In an embodiment of the invention, the magnet is disposed in a periphery of the voice coil, the voice coil has an inner side surface facing the perforation, and the first fixing portion is connected to the inner side surface.

In an embodiment of the invention, the voice coil is located in a periphery of the magnet, the voice coil has an outer side surface away from the magnet, and the first fixing portion is connected to the outer side surface.

In an embodiment of the invention, the deforming portion includes a plurality of concave portions and a plurality of convex portions, and each of the concave portions and each of the convex portions are arranged at intervals from each other.

In an embodiment of the invention, the perforation has a first axial direction parallel to a radial direction of the perforation, and the deforming portion is wavy or irregular in the first axial direction.

In an embodiment of the invention, the voice coil has a first end portion and a second end portion opposite to each other, the second end portion is closer to the bearing surface than the first end portion, and the diaphragm is connected to the frame and the second end portion of the voice coil.

In an embodiment of the invention, the diaphragm includes a first portion and a second portion located in a periphery of the first portion, the first portion has a first annular flat portion and an annular cone portion, the annular cone portion is located in a periphery of the first annular flat portion, the second portion has an annular convex portion and a second annular flat portion, and the second annular flat portion is located in a periphery of the annular convex portion.

In an embodiment of the invention, a material of the first portion is different from a material of the second portion, and a rigidity of the material of the first portion is greater than a rigidity of the material of the second portion.

Based on the above, in the speaker of the invention, when the magnetic circuit system is acted, the deforming portion of the balance element may be compressed or stretched with the movement of the voice coil, so as to achieve the effect of stabilizing the moving path of the voice coil, in order to avoid unexpected horizontal shaking of the voice coil, thereby avoiding the reduction of high-frequency sensitivity, and achieving the effect of stabilizing the quality of the treble.

In order to make the aforementioned features and advantages of the disclosure more comprehensible, embodiments accompanied with figures are described in detail below.

DESCRIPTION OF THE EMBODIMENTS

Figure 1:
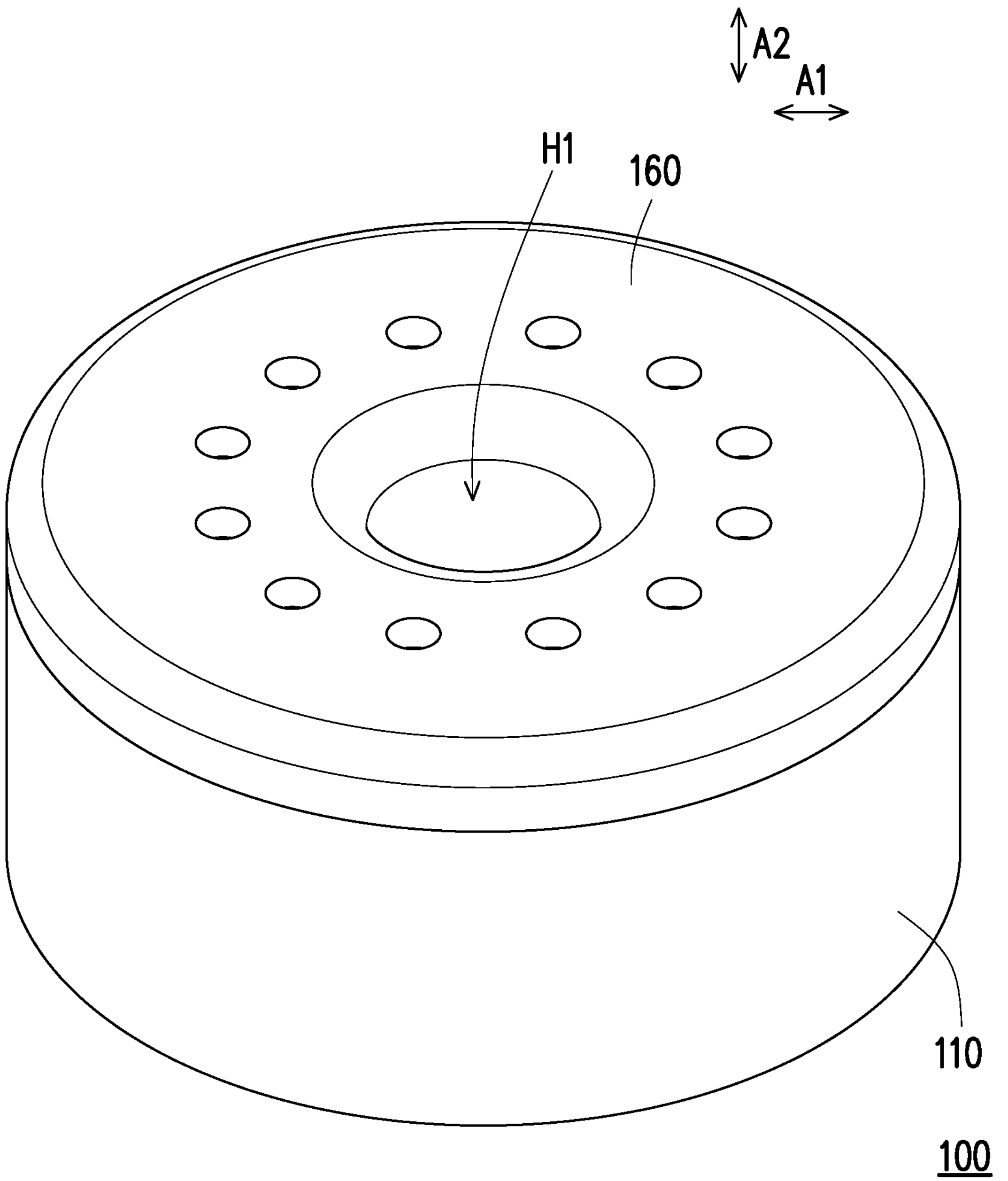
FIG. 1 is a schematic three-dimensional view of a speaker of an embodiment of the invention.
Figure 2A:
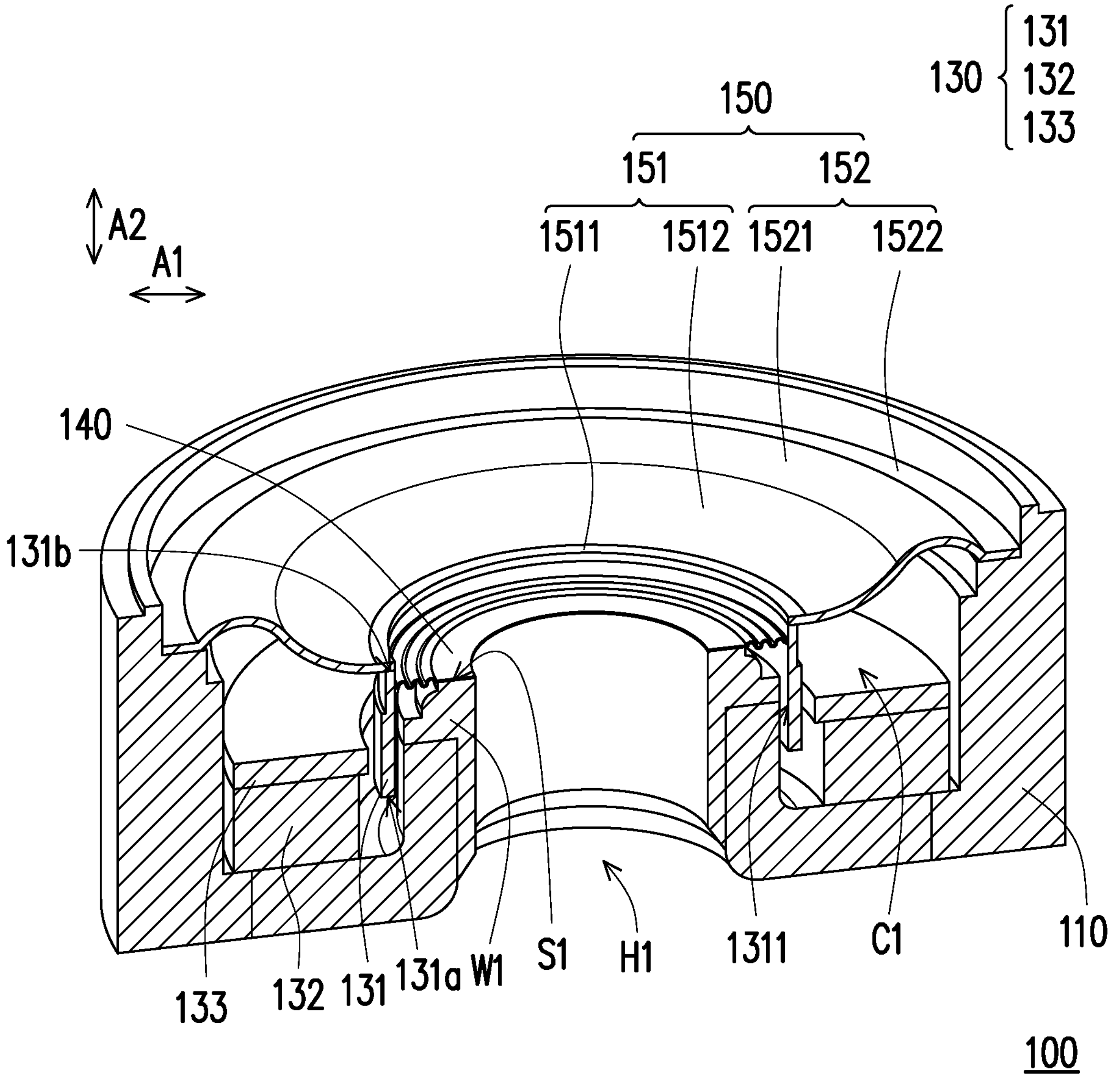
FIG. 2A is a schematic three-dimensional cross-sectional view of the speaker of FIG. 1.
Figure 2B:
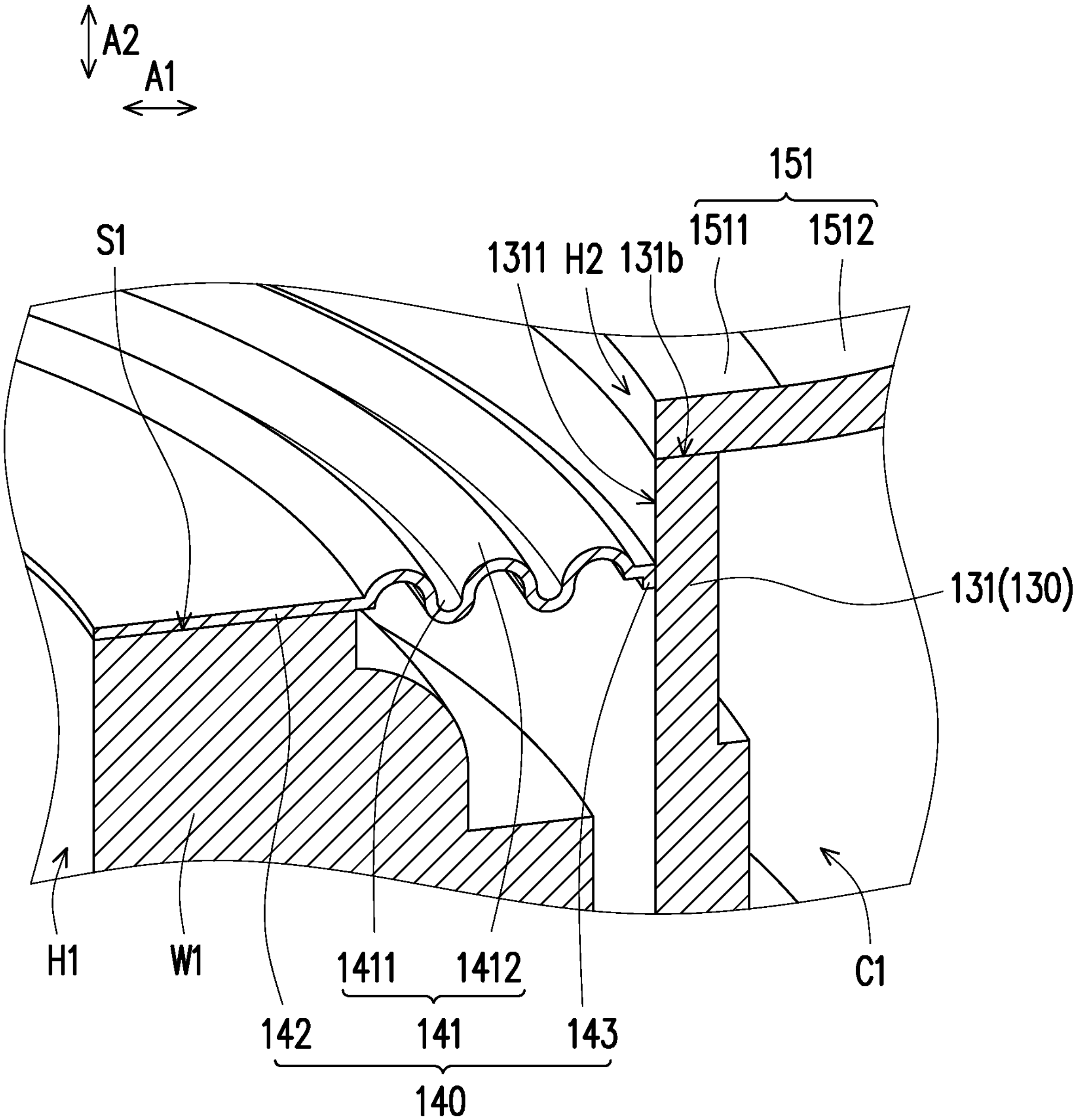
FIG. 2B is a partially enlarged three-dimensional cross-sectional view of the speaker of FIG. 2A.

FIG. 1 is a schematic three-dimensional view of a speaker of an embodiment of the invention. FIG. 2A is a schematic three-dimensional cross-sectional view of the speaker of FIG. 1. FIG. 2B is a partially enlarged three-dimensional cross-sectional view of the speaker of FIG. 2A. Referring to FIGS. 1 to 2B, a speaker 100 of the present embodiment includes a frame 110, a magnetic circuit system 130, a balance element 140, and a diaphragm 150. The frame 110 has a perforation H1, a bearing surface S1, and an accommodating space C1 surrounding the perforation H1. The diaphragm 150 has a hole H2 located in the center and corresponding to the perforation H1. The diaphragm 150 is connected to the frame 110 and the voice coil 131. Here, the material of the frame 110 includes metal. The speaker 100 of the present embodiment may be applied to earphones, but the application fields and devices are not limited thereto. It should be noted that the speaker 100 of the present embodiment further includes an upper cover 160, but the invention is not limited thereto. FIG. 2A and FIG. 2B omit the illustration of the upper cover 160 to illustrate the internal components thereof more clearly.

In the present embodiment, the magnetic circuit system 130 is disposed in the accommodating space C1 and includes a voice coil 131, a magnet 132, and a pole piece 133. The voice coil 131 and the magnet 132 surround the perforation H1, and the voice coil 131 is located between the bearing surface S1 and the magnet 132. The balance element 140 is disposed in the accommodating space C1 and surrounds the perforation H1, and the balance element 140 is connected to the voice coil 131 and the bearing surface S1. The bearing surface S1 is, for example, a top surface of a tube wall W1 formed in the periphery of the perforation H1, which is not limited in the invention. Further, in the present embodiment, the magnet 132 is located in the periphery of the voice coil 131 and is in the form of an inner voice coil. In the present embodiment, the number of the voice coil 131 and the magnet 132 is, for example, one. In other embodiments, the number of the voice coil 131 and the magnet 132 is, for example, a plurality, but the invention is not limited thereto. In an embodiment, the form of the voice coil 131 is, for example, a combined component of a coil and a paper tube, and the paper tube may be adhered to the balance element 140. In another embodiment, the voice coil 131 may also have no paper tube, and the coil may be adhered to the balance element 140. The form of the voice coil 131 may be determined according to actual process requirements, which is not limited in the invention.

Figure 3A:
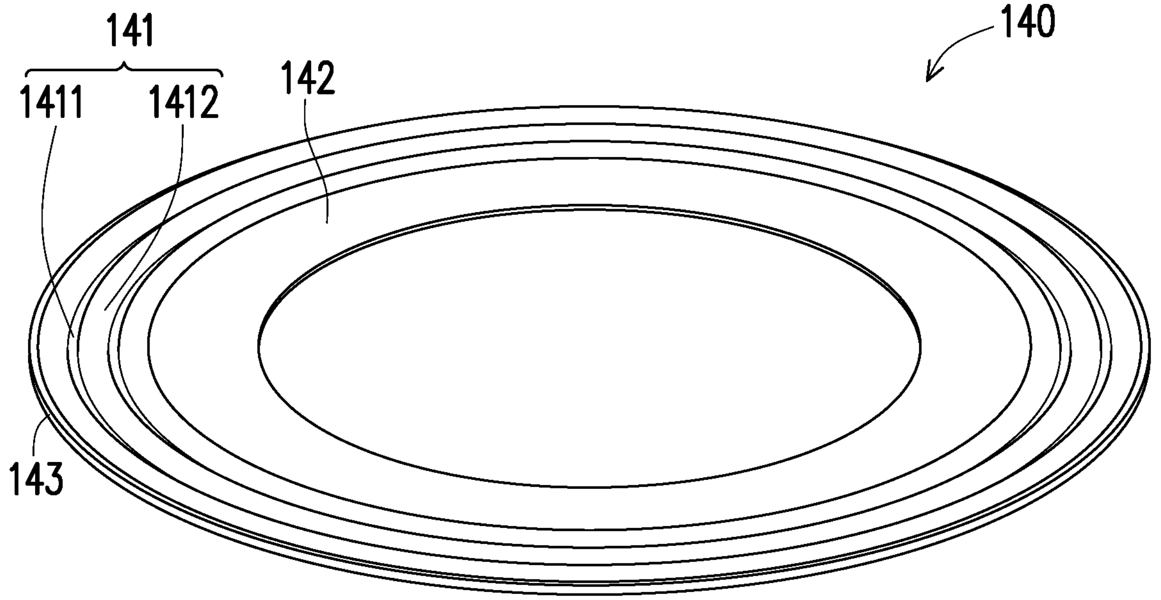
FIG. 3A is a schematic three-dimensional view of the balance element of the speaker of FIG. 2A.
Figure 3B:
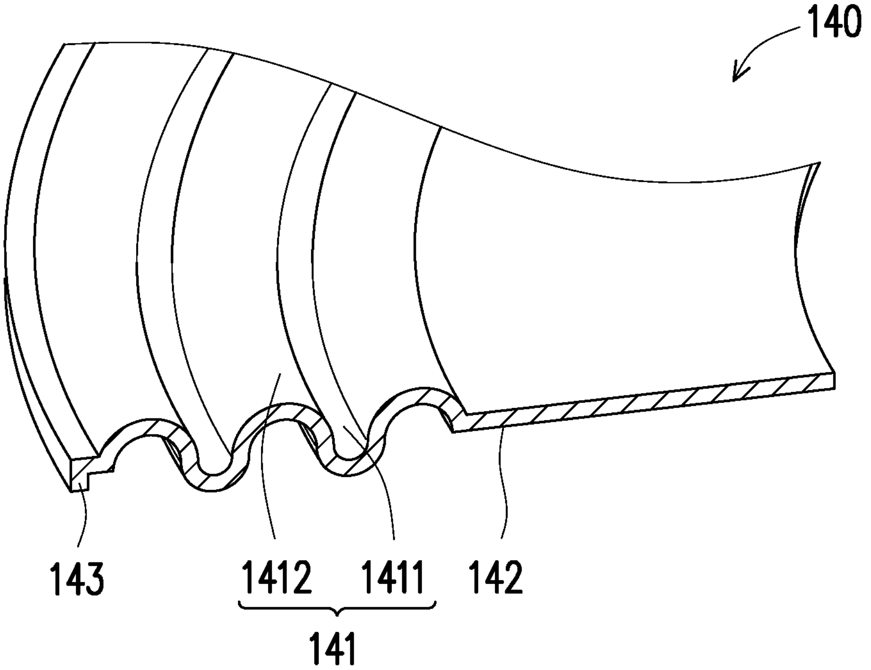
FIG. 3B is a partially enlarged three-dimensional cross-sectional view of the balance element of FIG. 3A.

FIG. 3A is a schematic three-dimensional view of the balance element of the speaker of FIG. 2A. FIG. 3B is a partially enlarged three-dimensional cross-sectional view of the balance element of FIG. 3A. In the present embodiment, the balance element 140 includes a first fixing portion 143, a deforming portion 141, and a second fixing portion 142. In the present embodiment, the first fixing portion 143 is the outer circumference of the balance element 140, and the second fixing portion 142 is the inner circumference of the balance element 140, that is, the first fixing portion 143 is in the periphery of the second fixing portion 142, but the invention is not limited thereto.

In the present embodiment, the deforming portion 141 includes a plurality of concave portions 1411 and a plurality of convex portions 1412, and each of the concave portions 1411 and each of the convex portions 1412 are arranged at intervals from each other.

Referring to FIG. 2B, in the present embodiment, the first fixing portion 143 is connected to the voice coil 131, the second fixing portion 142 is disposed at the bearing surface S1, and the deforming portion 141 is located between the second fixing portion 142 and the first fixing portion 143. The voice coil 131 has an inner side surface 1311 facing the perforation H1, and the first fixing portion 143 is connected to the inner side surface 1311 of the voice coil 131, but the invention is not limited thereto.

In the present embodiment, the perforation H1 has a first axial direction A1 parallel to the radial direction of the perforation H1, and the deforming portion 141 is wavy or irregular in the first axial direction A1. The second fixing portion 142 is, for example, a flat plate structure and extended along the first axial direction A1, but the invention is not limited thereto.

Figure 4A:
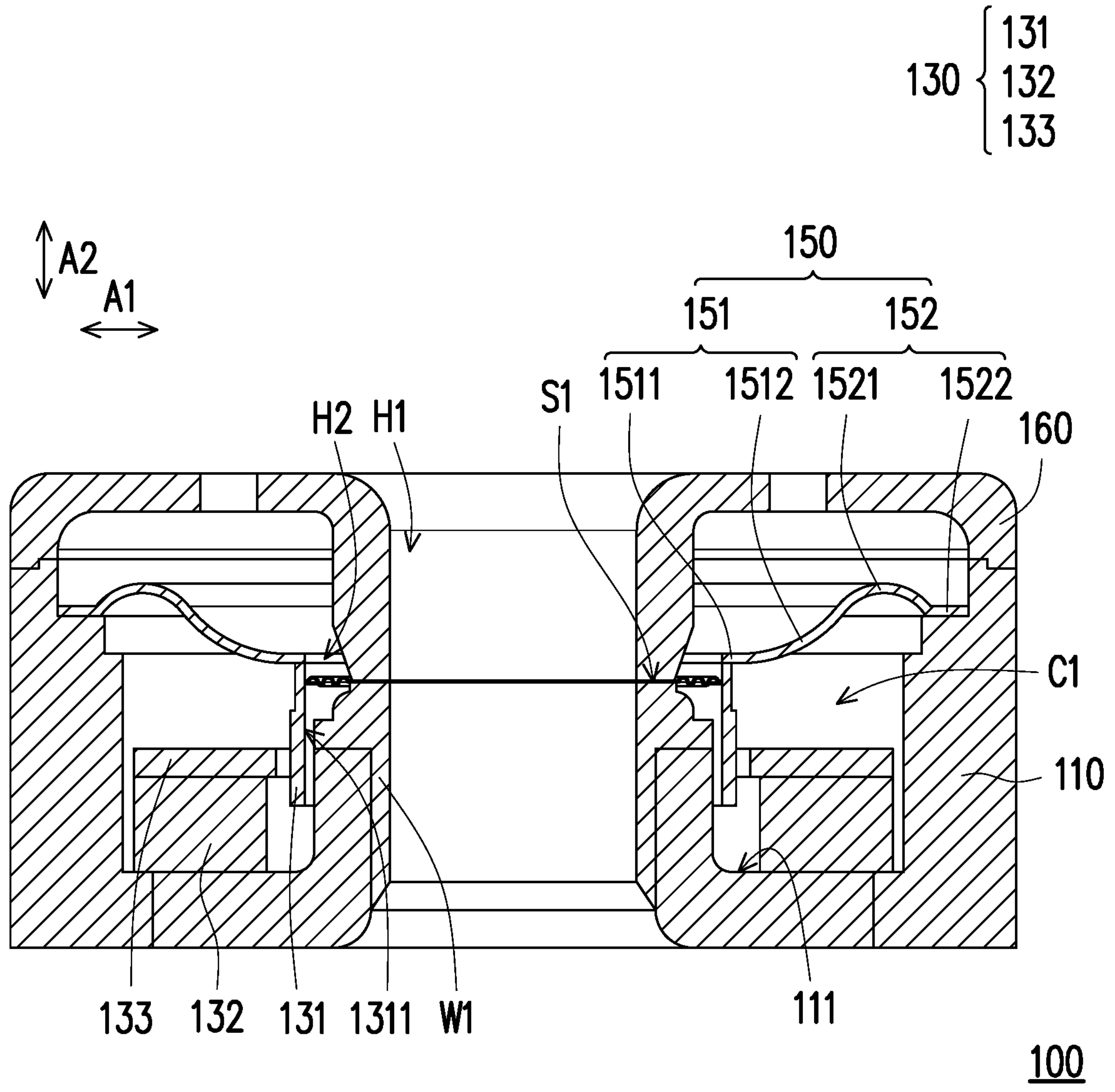
FIG. 4A is a schematic cross-sectional view of the speaker of FIG. 1.
Figure 4B:
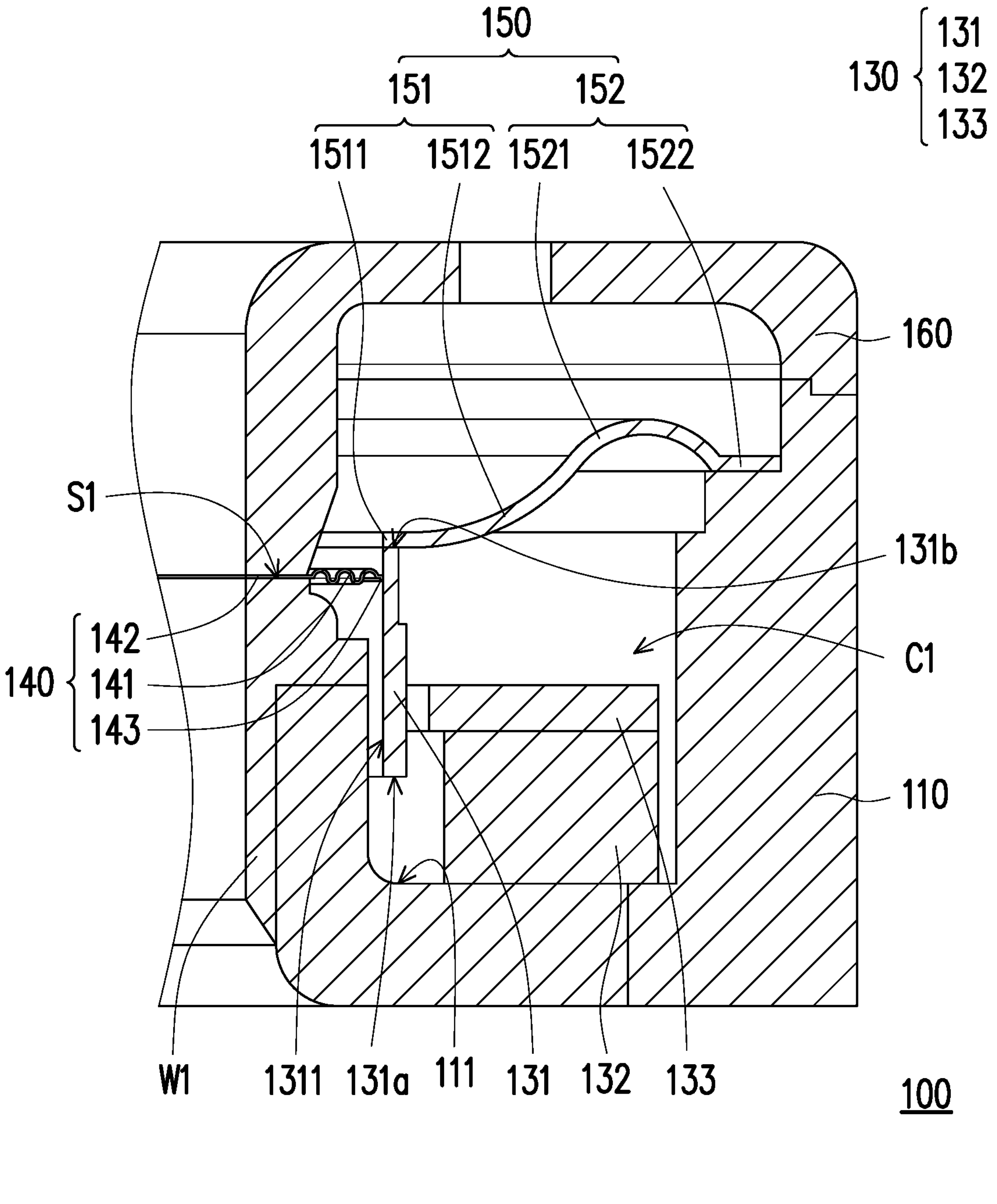
FIG. 4B is a partially enlarged cross-sectional view of the speaker of FIG. 4A.

FIG. 4A is a schematic cross-sectional view of the speaker of FIG. 1. FIG. 4B is a partially enlarged cross-sectional view of the speaker of FIG. 4A. Referring to FIGS. 4A and 4B, in the present embodiment, when the upper cover 160 is assembled to the frame 110, the upper cover 160 may be pressed against the bearing surface S1 to fix the second fixing portion 142 of the balance element 140 between the upper cover 160 and the frame 110, which is not limited in the invention.

Specifically, in the present embodiment, the frame 110 also has a first surface 111, and the magnet 132 is disposed at the first surface 111. The first surface 111 is, for example, the bottom surface of the frame 110. The pole piece 133 is disposed on the magnet 132. In a second axial direction A2 perpendicular to the first axial direction A1, the projection area of the magnet 132 on the first surface 111 surrounds the projection area of the voice coil 131 on the first surface 111, the projection area of the voice coil 131 on the first surface 111 surrounds the projection area of the bearing surface S1 on the first surface 111, and the projection area of the balance element 140 on the first surface 111 is staggered from the projection area of the voice coil 131 on the first surface 111.

In the present embodiment, under the action of the magnetic field of the magnet 132 and the pole piece 133, the voice coil 131 is driven to move, so the diaphragm 150 connected to the voice coil 131 is also moved, driving the air adjacent to the diaphragm 150 to vibrate to produce sound. In addition, the external ambient sound may enter the inside of the ear canal via the perforation H1, so that the user may hear the external ambient sound, so as to avoid uncomfortable feelings of wear such as blocking or sealing.

In the present embodiment, the voice coil 131 has a first end 131*a* and a second end 131*b* opposite to each other, the second end 131*b* is closer to the bearing surface S1 than the first end 131*a*, the diaphragm 150 is connected to the frame 110 and the second end 131*b* of the voice coil 131, and the first end 131*a* of the voice coil 131 is spaced from the first surface 111.

In the present embodiment, the material of the balance element 140 is, for example, paper, foam, composite material, or plastic polymer, etc., but the invention is not limited thereto. In the present embodiment, the deforming portion 141, the second fixing portion 142, and the first fixing portion 143 are, for example, integrally formed, but the invention is not limited thereto.

Under the above configuration, since the balance element 140 is located between the voice coil 131 and the tube wall W1 of the perforation H1, when the magnetic circuit system 130 is acted and the voice coil 131 is moved, the deforming portion 141 of the balance element 140 may be compressed or stretched along with the movement of the voice coil 131. Therefore, the deflection of the voice coil 131 on the first axial direction A1 may be avoided. In this way, the effect of stabilizing the voice coil 131 may be achieved via the connection relationship between the first fixing portion 143 of the balance element 140 and the voice coil 131, so as to avoid unexpected shaking of the voice coil 131 on the first axial direction A1, thus in turn avoiding a reduction in high-frequency sensitivity.

Figure 5:
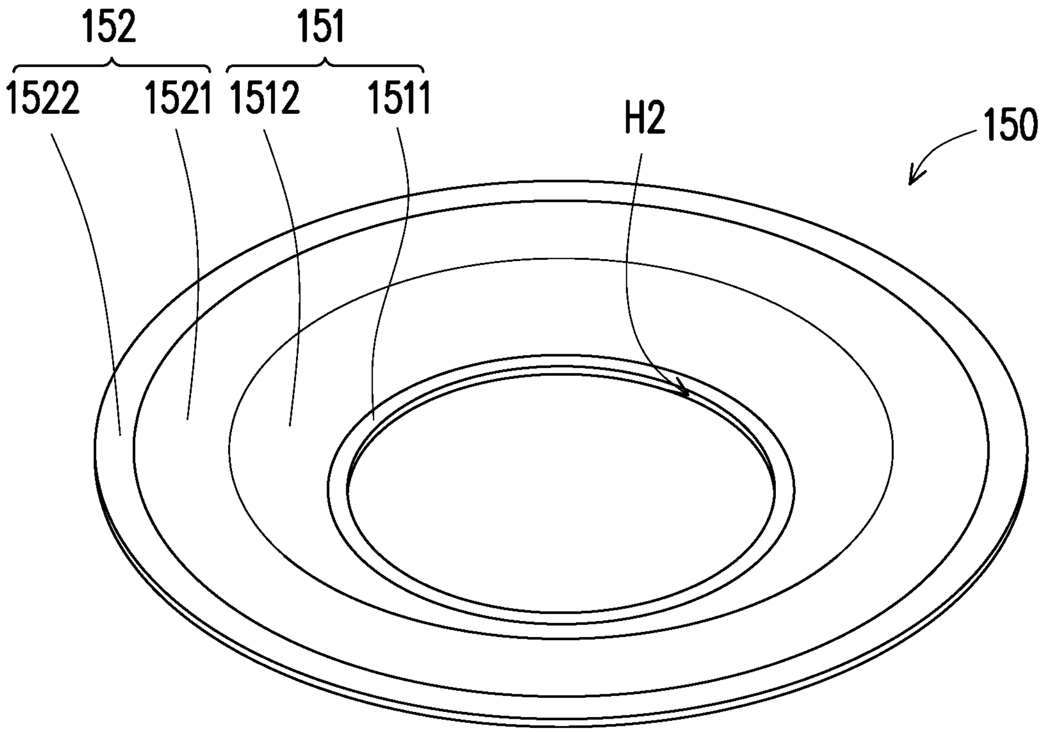
FIG. 5 is a schematic three-dimensional view of the diaphragm of the speaker of FIG. 4A.

FIG. 5 is a schematic three-dimensional view of a diaphragm of the speaker of FIG. 4A. In more detail, please refer to FIG. 5, in the present embodiment, the diaphragm 150 includes a first portion 151 and a second portion 152 located in the periphery of the first portion 151. The hole H2 is formed at the inner edge of the first portion 151.

In an embodiment, the material of the diaphragm 150 is, for example, a composite of a plurality of materials. The material of the first portion 151 is different from the material of the second portion 152, and the rigidity of the material of the first portion 151 is greater than the rigidity of the material of the second portion 152. The material of the first portion 151 is, for example, an aluminum-magnesium alloy, but the invention is not limited thereto. The material of the second portion 152 is, for example, polyurethane (PU) or mylar, but the invention is not limited thereto.

In this way, the soft second portion 152 and the first portion 151 with greater rigidity may take into account the vibration amplitude of the diaphragm 150 and the rigidity of the vibration plate at the same time, so as to improve the performance of the frequency response curve, improve high-frequency stability, and reduce resonance frequency. In other embodiments, the diaphragm 150 may also be made of a single material, which is not limited in the invention.

In the present embodiment, a groove or a rib structure may be added to the surface of the diaphragm 150. For example, the first portion 151 has a first annular flat portion 1511 and an annular cone portion 1512. The first annular flat portion 1511 is connected to the second end portion 131*b* of the voice coil 131, and the annular cone portion 1512 is located in the periphery of the first annular flat portion 1511, but the invention is not limited thereto.

In the present embodiment, the second portion 152 has an annular convex portion 1521 and a second annular flat portion 1522. The annular convex portion 1521 is connected to the annular cone portion 1512, the second annular flat portion 1522 is located in the periphery of the annular convex portion 1521, and the second annular flat portion 1522 is connected to the frame 110, but the invention is not limited thereto.

Other embodiments are listed below for illustration. It should be mentioned that, the embodiments below use the same reference numerals and portions of the content from previous embodiments. Specifically, the same reference numerals are used to represent the same or similar elements, and descriptions of the same techniques are omitted. The omitted portions are as described in the embodiments above and are not repeated in the embodiments below.

Figure 6A:
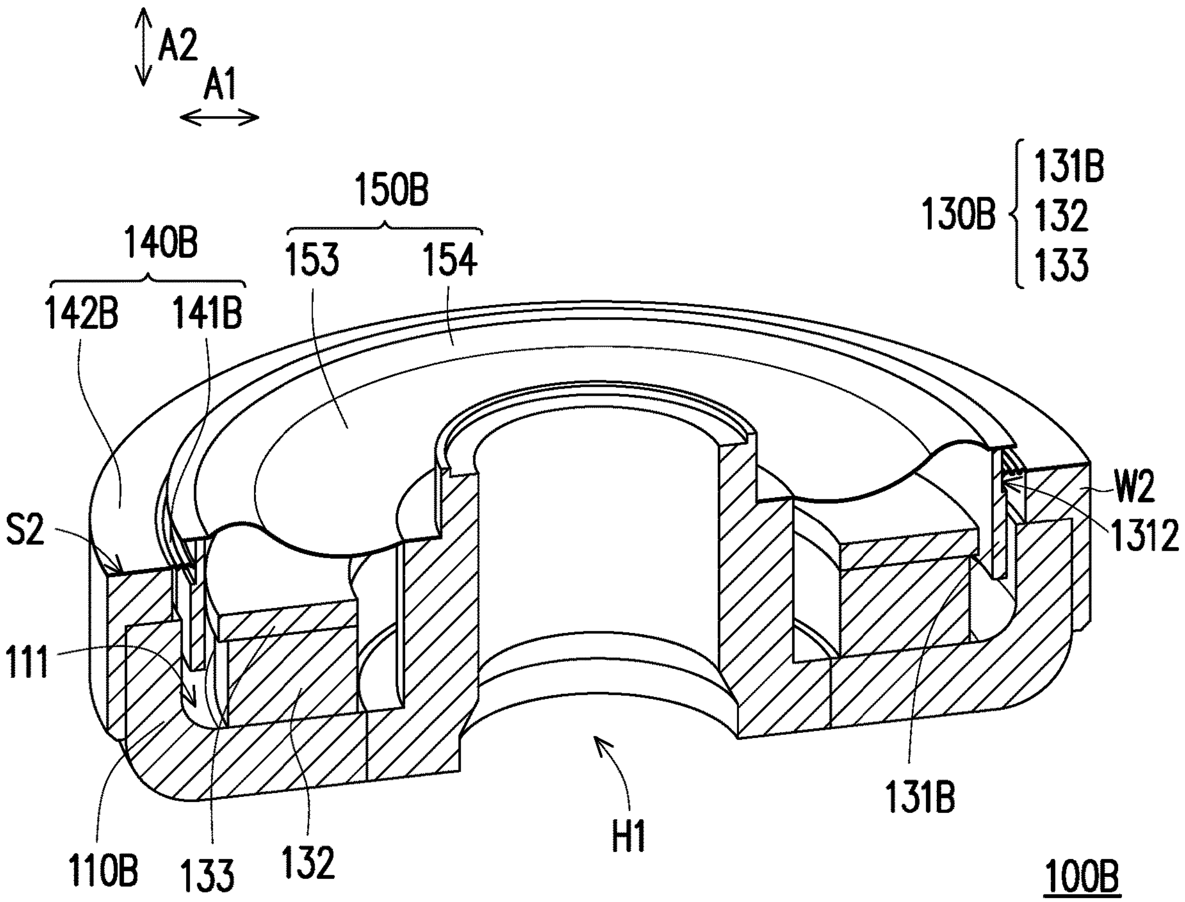
FIG. 6A is a schematic three-dimensional cross-sectional view of a speaker of an embodiment of the invention.
Figure 6B:
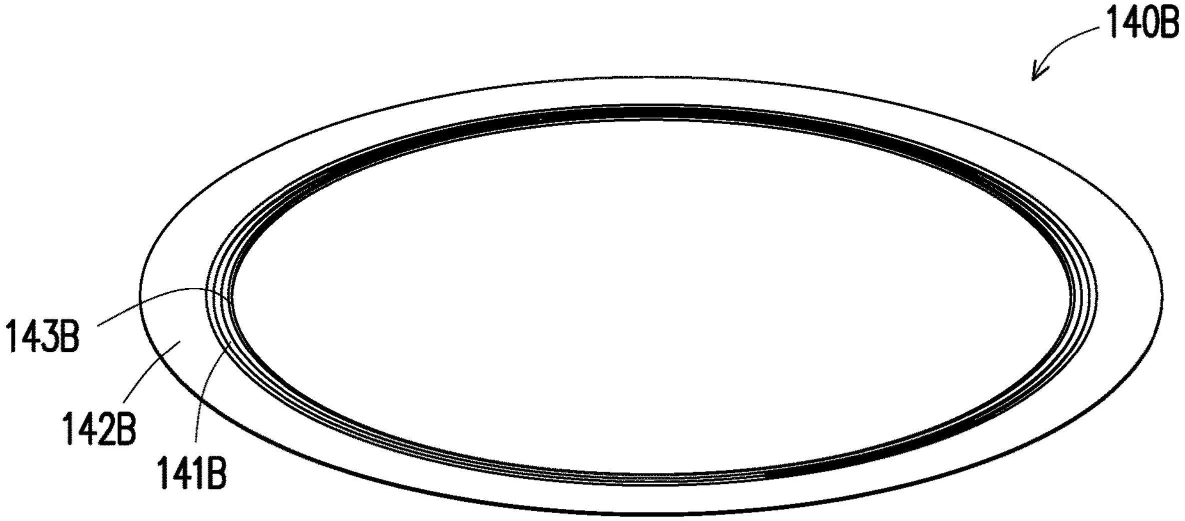
FIG. 6B is a schematic three-dimensional view of the balance element of FIG. 6A.
Figure 6C:
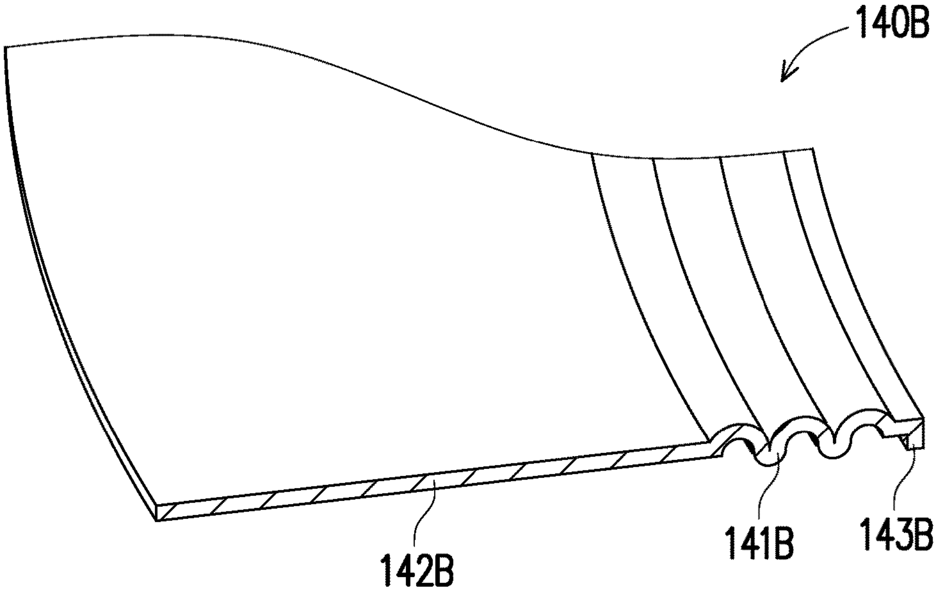
FIG. 6C is a partially enlarged cross-sectional view of the balance element of FIG. 6B.

FIG. 6A is a schematic three-dimensional cross-sectional view of a speaker of an embodiment of the invention. FIG. 6B is a schematic three-dimensional view of the balance element of FIG. 6A. FIG. 6C is a partially enlarged cross-sectional view of the balance element of FIG. 6B. Referring to FIG. 6A to FIG. 6C, in the present embodiment, a speaker 100B is slightly different from the speaker 100 of FIG. 2A, and the main difference lies in the form of a magnetic circuit system 130B.

Specifically, the voice coil 131B of the speaker 100B is located in the periphery of the magnet 132 and is in the form of an outer voice coil. The voice coil 131B has an outer side surface 1312 away from the magnet 132, and a first fixing portion 143B is connected to the outer side surface 1312. In the second axial direction A2, the projection area of a bearing surface S2 on the first surface 111 surrounds the projection area of the voice coil 131B on the first surface 111. The bearing surface S2 is, for example, a top surface of an outer wall W2 of a frame 110B, which is not limited in the invention.

In the present embodiment, the first fixing portion 143B is the inner circumference of the balance element 140B, a second fixing portion 142B is the outer circumference of the balance element 140B, and a deforming portion 141B is located between the first fixing portion 143B and the second fixing portion 142B. That is to say, the second fixing portion 142B is in the periphery of the first fixing portion 143B, but the invention is not limited thereto.

Further, as shown in FIG. 6A, in the present embodiment, a diaphragm 150B has an annular concave portion 153 and an annular convex portion 154, and the annular convex portion 154 surrounds the annular concave portion 153, but the invention is not limited thereto. The diaphragm 150B of the speaker 100B may be made of a single material or a composite material, but the invention is not limited thereto.

Moreover, the speaker 100B may further include an upper cover similar to that shown in FIG. 4A, and the upper cover may be pressed against the bearing surface S2 by assembling the upper cover to the frame 110B, so that the second fixing portion 142B of the balance element 140B is fixed between the upper cover and the frame 110B, but the invention is not limited thereto.

Under the above configuration, since the balance element 140B is located between the voice coil 131B and the outer wall W2, when the magnetic circuit system 130B is acted and the voice coil 131B is moved, the deforming portion 141B of the balance element 140B may be compressed or stretched along with the movement of the voice coil 131B. Therefore, the deflection of the voice coil 131B on the first axial direction A1 may be avoided. In this way, the effect of stabilizing the voice coil 131B may be achieved via the connection relationship between the first fixing portion 143B of the balance element 140B and the voice coil 131B, so as to avoid unexpected shaking of the voice coil 131B on the first axial direction A1, thus in turn avoiding a reduction in high-frequency sensitivity.

Figure 7:
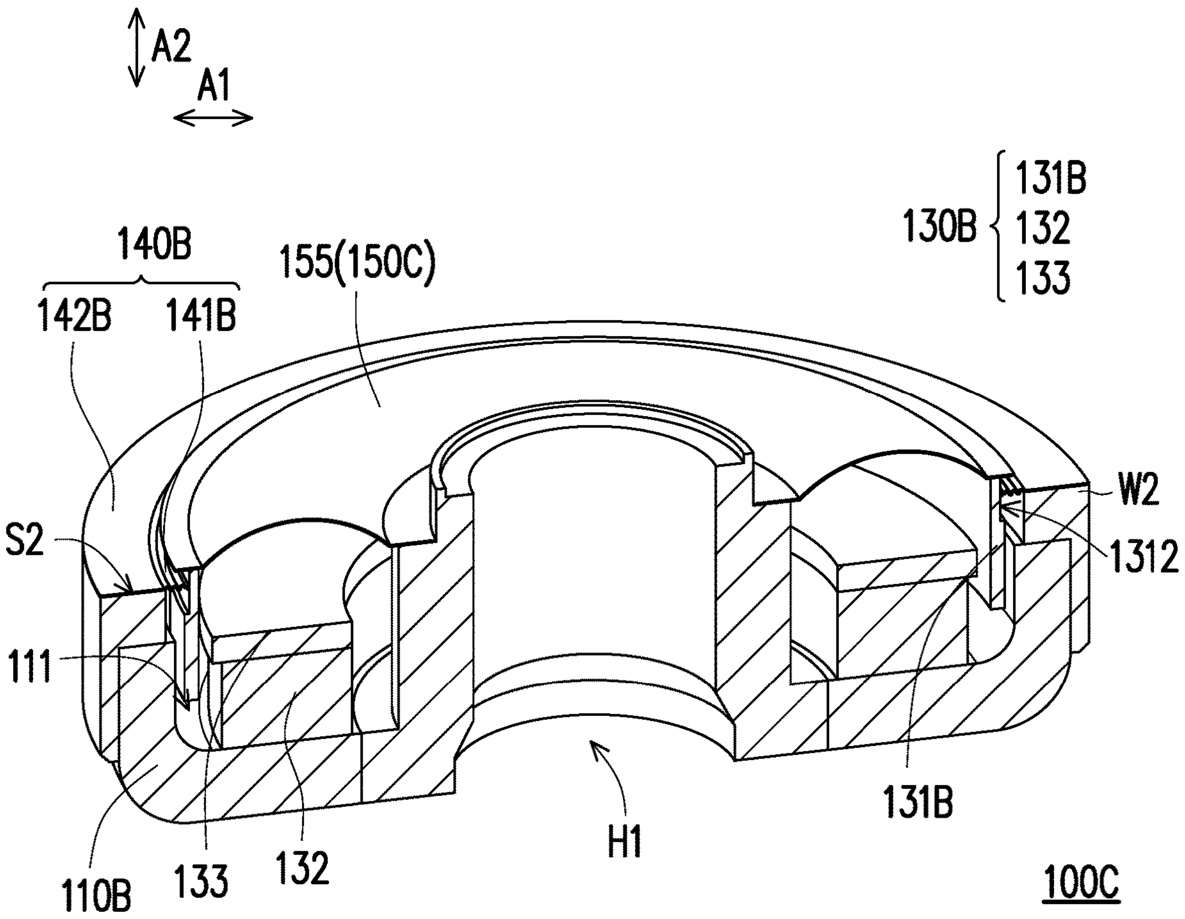
FIG. 7 is a schematic three-dimensional cross-sectional view of a speaker of an embodiment of the invention.

FIG. 7 is a schematic three-dimensional cross-sectional view of a speaker of an embodiment of the invention. Referring to FIG. 7, in the present embodiment, a speaker 100C is slightly different from the speaker 100B of FIG. 6A, and the main difference lies in the form of a diaphragm 150C of the speaker 100C. In the present embodiment, the diaphragm 150C has an annular convex portion 155 and the annular concave portion 153 of FIG. 6A is omitted, but the invention is not limited thereto.

Based on the above in the speaker of the invention, when the magnetic circuit system is acted, the deforming portion of the balance element may be compressed or stretched with the movement of the voice coil, so as to achieve the effect of stabilizing the moving path of the voice coil, in order to avoid unexpected horizontal shaking of the voice coil on the first axial direction, thereby avoiding the reduction of high-frequency sensitivity, and achieving the effect of stabilizing the quality of the treble.

Although the invention has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. A speaker, comprising:

a frame having a perforation, a bearing surface, and an accommodating space surrounding the perforation;

a magnetic circuit system disposed in the accommodating space and comprising a voice coil and a magnet, and the voice coil is located between the bearing surface and the magnet;

a diaphragm having a hole corresponding to the perforation, and the diaphragm is connected to the frame and the voice coil; and a balance element disposed in the accommodating space and surrounding the perforation, and the balance element is connected to the voice coil and the bearing surface.

2. The speaker of claim 1, wherein the balance element comprises a first fixing portion, a deforming portion, and a second fixing portion, the first fixing portion is connected to the voice coil, the second fixing portion is disposed at the bearing surface, and the deforming portion is located between the second fixing portion and the first fixing portion.

3. The speaker of claim 2, wherein the magnet is disposed in a periphery of the voice coil, the voice coil has an inner side surface facing the perforation, and the first fixing portion is connected to the inner side surface.

4. The speaker of claim 2, wherein the voice coil is located in a periphery of the magnet, the voice coil has an outer side surface away from the magnet, and the first fixing portion is connected to the outer side surface.

5. The speaker of claim 2, wherein the deforming portion comprises a plurality of concave portions and a plurality of convex portions, and each of the concave portions and each of the convex portions are arranged at intervals from each other.

6. The speaker of claim 5, wherein the perforation has a first axial direction parallel to a radial direction of the perforation, and the deforming portion is wavy or irregular in the first axial direction.

7. The speaker of claim 1, wherein the voice coil has a first end portion and a second end portion opposite to each other, the second end portion is closer to the bearing surface than the first end portion, and the diaphragm is connected to the frame and the second end portion of the voice coil.

8. The speaker of claim 7, wherein the diaphragm comprises a first portion and a second portion located in a periphery of the first portion, the first portion has a first annular flat portion and an annular cone portion, the annular cone portion is located in a periphery of the first annular flat portion, the second portion has an annular convex portion and a second annular flat portion, and the second annular flat portion is located in a periphery of the annular convex portion.

9. The speaker of claim 8, wherein a material of the first portion is different from a material of the second portion, and a rigidity of the material of the first portion is greater than a rigidity of the material of the second portion.

* * * * *